United States Patent [19]

Mann et al.

[11] Patent Number: 4,657,274
[45] Date of Patent: Apr. 14, 1987

[54] RETRACTABLE KING PIN VEHICLE

[76] Inventors: William B. Mann; Dennis A. Domingos, both of P.O. Box 544, Solvang, Calif. 93464

[21] Appl. No.: 776,524

[22] Filed: Sep. 16, 1985

[51] Int. Cl.$^4$ .............................................. B62D 53/08
[52] U.S. Cl. ................................. 280/433; 280/415 R; 280/423 R; 280/511
[58] Field of Search ............... 280/433, 438 R, 415 R, 280/423 R, 504, 511, 490 R, 491 R, 491 A

[56] References Cited

U.S. PATENT DOCUMENTS

| | | | |
|---|---|---|---|
| 2,998,267 | 8/1961 | Zajac et al. | 280/433 |
| 3,647,243 | 3/1972 | Nagy et al. | 280/433 |
| 3,870,342 | 3/1975 | Baxter et al. | 280/433 |
| 4,103,928 | 8/1978 | Sheppard, Jr. | 280/490 |
| 4,546,994 | 10/1985 | Taylor | 280/511 |

Primary Examiner—David M. Mitchell
Assistant Examiner—Donn McGiehan
Attorney, Agent, or Firm—Harry W. Brelsford

[57] ABSTRACT

A flat bed vehicle has a king pin mounted in the flat bed for connection to a trailer to create a fifth wheel tractor-trailer combination. The king pin is vertically reciprocated above the flat bed and below the flat bed by a hand crank located at an outside edge of the flat bed. The king pin is held in its upward position by means of a horizontal bolt passing through a hole in the king pin. The bolt is manually removed from the king pin, for lowering the king pin, by a manual pull rod extending to the exterior of the vehicle bed, preferably adjacent to the hand crank.

8 Claims, 3 Drawing Figures

RETRACTABLE KING PIN VEHICLE

TECHNICAL FIELD

This invention relates to tractor vehicles having a retractable king pin to which a trailer vehicle may be connected and has particular reference to a vertically moveable king pin that is operated from a remote part of the vehicle.

BACKGROUND OF THE INVENTION

Tractor and trailer combinations are increasingly being used for transportation of livestock and other commodities. The tractor vehicles are generally of a specialized nature, especially for highway use. There is, however, a need for a generalized type of tractor vehicle that can be used for general truck purposes. This need has led to the widespread use of pickup trucks and general utility trucks as tractor vehicles wherein the trailer hitch or king pin is mounted on the bed of the truck rather than at the tailgate or rear end of the truck. These tractor-trailer combinations are generally referred to as fifth wheel tractor-trailer combinations.

When, however the trailer is disconnected and the tractor-truck is used for general hauling, means must be provided to remove the king pin from the bed of the truck so that a flat uninterrupted bed can be formed. Various mechanisms have been used to move the king pin including gearing arrangements, spring loaded pins, and hinged pins. Most such arrangements heretofore required the operator to mount the bed of the truck to manipulate the mechanisms.

BRIEF DESCRIPTION OF THE INVENTION

The king pin of the present invention is vertically moveable from a position below the bed of a tractor truck to a position projecting above the bed of the truck. A manually rotatable shaft extends from the king pin to the exterior of the bed of the truck and the rear edge of the truck is presently preferred as the exterior location for the outer end of the shaft. A crank or other rotating mechanism is provided for manually rotating the shaft. A rack and gear arrangement is presently preferred as the mechanism for vertically moving the king pin.

The king pin is mechanically secured in its elevated position by means of a sliding bolt that is spring biased to maintain the bolt in a hole in the king pin. The sliding bolt locks the pin to a structurally strong housing including support beams permanently built into the frame structure of the tractor truck. A sliding rod extends from the sliding bolt to the exterior of the bed of the truck, and its outer end is preferably located adjacent to the outer end of the rotary shaft. The sliding rod is manually pulled to release the bolt from the king pin so that the king pin can be retracted by rotating the rotatable shaft.

The apparatus is operated from the exterior of the truck bed. No tools are needed to remove or retract the projecting king pin. Two manual controls extend to the exterior of the truck bed, one to pull the bolt out of engagement with the king pin and the other to retract the king pin. In this fashion the driver of the vehicle can readily convert the truck from a fifth wheel tractor to a cargo carrying flatbed truck with no protrusions in the flatbed. When it is desired to project the king pin, the gear is manually rotated and engages the rack to elevate the king pin. When the hole of the king pin is opposite the bolt, the spring biased bolt snaps into the king pin hole. This ease of manual conversion is accompanied by great mechanical security against the king pin retracting while in use.

BRIEF DESCRIPTION OF THE DRAWINGS

Various objects, advantages and features of the invention will be apparent in the following description and claims considered together with the drawings forming an integral part of the application, in which:

DETAILED DESCRIPTION

Figure 1:
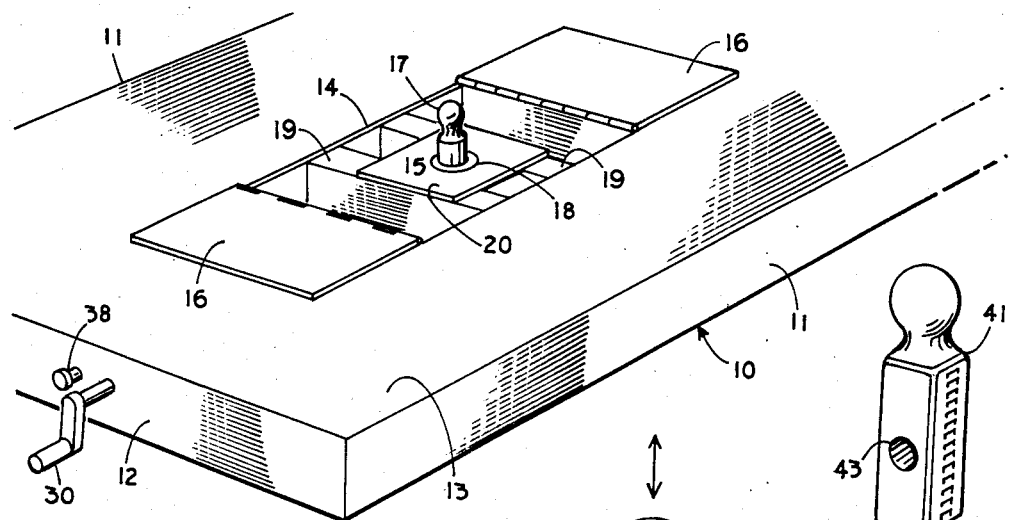
FIG. 1 is a three dimensional view of the bed of a tractor truck above which the king pin projects and showing the rotatable shaft and sliding rod extending to the rear edge of the bed.

Referring to FIG. 1, there is illustrated a bed 10 of a tractor vehicle having side edges 11, a rear edge 12 and a top surface 13. Cut within the top surface 13 is a rectangular opening 14 which is preferably closed by hinged covers 16 which form a flat surface when closed. Projecting upwardly above the bed 13 is a king pin 17 preferably equally distant from each side edge 11. The king pin 17 is disposed in the housing 15 which includes transverse frame members 19, a guide 18 and a horizontal plate 20 welded or otherwise secured to the transverse frame members 19.

Figure 2:
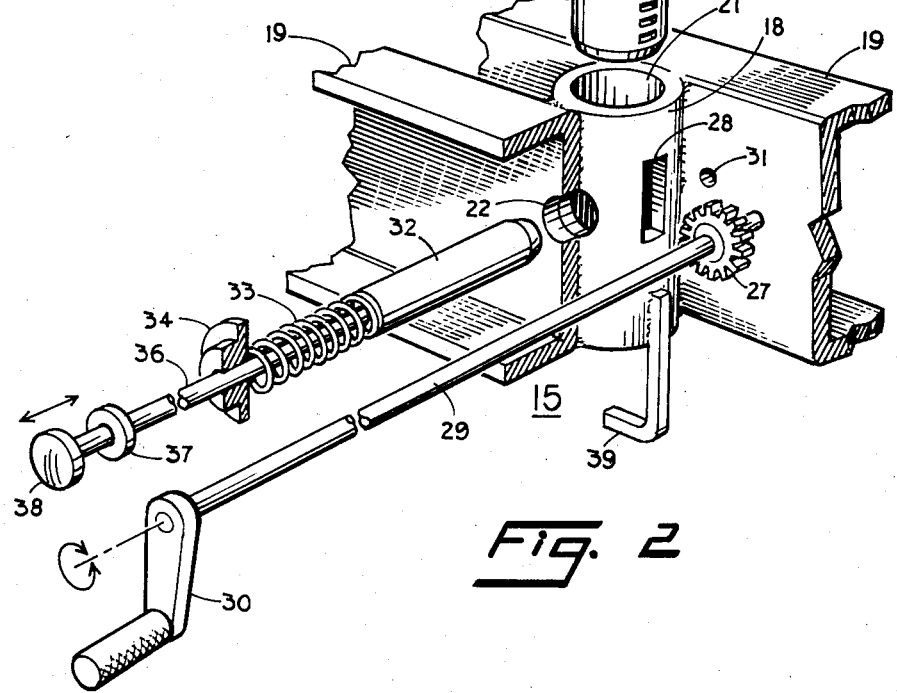
FIG. 2 is an exploded three dimensional view on an enlarged scale of the mechanical parts of the invention of FIG. 1 including a rack and gear elevating and depressing mechanism for the king pin and the sliding bolt structure, but with the upper horizontal plate removed.

Illustrated in more detail in FIG. 2 is the housing 15 and other mechanical parts of the invention. It will be noted that the vertical guide 18 may be welded or otherwise secured to the transverse frame members 19. The housing 15 has a vertical bore 21 and a horizontal bore 22. The king pin 17 reciprocates within the bore 21 and the king pin may have various shapes of its upper end of which the round ball type is the most common and is illustrated at 23. The king pin 17 has a vertical rack 24 which has teeth formed by cutting into the periphery of the king pin. The king pin 17 also has a transverse or horizontal hole 26 of the same general diameter as the transverse bore 22 in the housing 20.

The king pin 17 is elevated and retracted by means of a spur gear 27 engaging the teeth of the rack 24. For this purpose, a slot 28 is formed in the sidewall of the guide 18, and the spur gear 27 projects into that slot 28 to engage the rack 24. The gear 27 is mounted on a rotary shaft 29, one end of which fits in a bearing hole 31, and the other end is provided with a crank 30. This crank is the same as that illustrated in FIG. 1 and preferably projects out the rear of the vehicle bed 10.

Also illustrated in FIG. 2 is the bolt that locks the king pin 17 in an extended position, as shown in FIG. 1. A cylindrical bolt 32 is of a diameter to fit in the horizontal bore 22 of the housing 20 and into also the horizontal bore 26 in the king pin 17. Therefore, when the king pin 17 is disposed within the guide 18 shown in FIG. 1, then the bolt 32 passes through the king pin 17 by means of its hole 26, thereby securely locking the king pin 17 to its housing 15. The bolt 32 is maintained in its locking position by means of a compression spring 33, bearing against one end of the bolt 32 and the other end against an apertured plate 34 forming part of the bed structure of the truck. The bolt moved is to the rear of the bed 10, as viewed in FIG. 1, and to the left as viewed in FIG. 2, by means of a mechanical pull rod 36 connected to the bolt 32, and the other end passes through a bearing 37 in the rear edge 12 of the truck and terminates in an enlargement or ball 38 that may be easily manually grasped by an operator. The spring 33 normally urges the bolt to the right to pass it through the horizontal housing bore 22 and the horizontal bore 26 in the king pin 17. When it is desired, however, to retract the ball, the pin is pulled to the left, as viewed in FIG. 2, by manually pulling on the knob or ball 38 of the rod 36.

Figure 3:
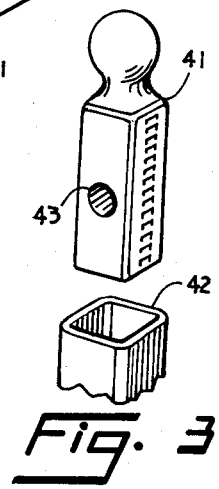
FIG. 3 is a three dimensional view of a modified form of king pin having a generally rectangular cross section and vertically slideable in a rectangular guide.

Referring to FIG. 3, there is illustrated a modified form of the invention wherein a king pin 41 has a square cross section and fits within a guide 42 which is also of a square cross section and may have a horizontal bore (not shown) through which a pin can act to contact a horizontal hole 43 in the king in 41. This construction prevents rotation of the king pin about its longitudinal axis.

It will be appreciated by those in the art that king pins do not all terminate in an upper ball, but they may have various shapes such as a T-shaped profile which is also commonly used.

OPERATION

The device is shown in its extended or upward position in FIG. 1 and in that position the bolt 32 of FIG. 2 passes through the housing horizontal bore 22 and through the hole 26 in the king pin 17 and through a second housing bore 22 (not shown) to lock the king pin in its upward position shown in FIG. 1. The bolt is maintained in its locking position by means of the compression spring 33. When it is desired to lower the king pin 17, then the operator manually pulls on the knob 38 to the left, and this pulls the pin 32 to the left against the compression of spring 33. The operator then rotates the spur gear 27 in a counterclockwise direction, and this causes the pin to reciprocate downwardly in the guide 18 because of the contact of the teeth of the spur 27 with the teeth of the rack 24 formed in the king pin 17. The downward movement of the king pin 17 is halted by means of a mechanical stop 39 secured to the housing 15. When it is desired to elevate the king pin 17, as shown in FIG. 1, then the spur gear 27 is rotated clockwise and its teeth engaging the rack 24 cause the king pin to move upwardly. During this upward movement, the bolt 32 will be urged by spring 33 against the pin 17, and when the pin hole 26 is in alignment with the bolt 32, then the bolt will move into the hole 26 to lock the pin. The horizontal bore 22 and the housing 15 is preferably duplicated on the far side of the guide 18 and through the metal of the transverse frame member 19.

It will be appreciated that the round king pin 17 fitting in round guide 18 might be subject to rotation, in which case the bolt 32 would not be able to pass through the hole 26 in the king pin. The king pin 17 is elongated, and rotation would take place about its longitudinal axis. The correct alignment, however, from a rotational standpoint, is maintained by the interfitting of the teeth of the gear 27 with the recesses between the teeth of the rack 24. This problem does not arise, however, with the king pin of FIG. 3, inasmuch as the square or rectangular cross section of the king pin 41 and the bore in the guide 42 are both rectangular cross sections, preventing any rotation.

The invention has been described with respect to its presently preferred embodiment as required by the statues. Variations and modifications of the disclosed structure will occur to those skilled in the art. For example, the hole 26 in the king pin 17 need not be a through hole, but the through hole and double support of the bolt on the housing is preferable. All such variations and modificatins that fall within the true spirit and scope of the invention are included within the scope of the following claims:

What is claimed is:

1. A truck having a flat bed with a work surface and with outer edges of the flat bed, in combination with a retractable king pin having a horizontal hole, comprising:
   a. a housing secured to the flat bed below the flat bed surface and having a vertical bore and an intersecting horizontal bore, said king pin being vertically reciprocatable in the vertical housing bore for retraction below the surface of the flat bed when the truck is used for cargo and extension above the surface of the flat bed for use in hauling a trailer;
   b. a horizontally reciprocatable bolt moveable into the housing horizontal bore and the king pin horizontal hole for locking the king pin to the housing and moveable out of engagement with the king pin hole for retraction of the king pin;
   c. a first mechanical control extending from the bolt to an outer edge of the flat bed for reciprocating the bolt into and out of the hole in the king pin;
   d. and a second mechanical control extending from the king pin to an outer edge of the flat bed for extending and retracting the pin.

2. The combination of claim 1 element (d), wherein the second mechanical control for extending and retracting the king pin, includes a rack formed on the king pin and a spur gear rotatably mounted on the housing and engaging the rack and a rotatable shaft is drivingly connected to the spur gear.

3. The combination of claim 1 wherein the housing vertical bore and the king pin have circular cross sections, and wherein element (d) of claim 1, the control for extending and retracting the king pin, includes a rack on the king pin within its circular cross section and includes also a spur gear engaging the rack, whereby the king pin is restrained from rotation in the housing by the engagement of the spur gear and the rack, so that the king pin horizontal hole retains angular alignment with the bolt.

4. The combination of claim 1 wherein the housing vertical bore is of rectangular cross section and the king pin has a similar rectangular cross section.

5. The combination of claim 1 wherein the flat bed of the truck has an opening of greater size than the cross section of the king pin and a hinged cover is secured to the flat bed to cover the opening.

6. The combination of a truck having a flat bed with a work surface and with outer edges of the flat bed, in combination with a vertically reciprocatable king pin mounted on the bed of the truck for retraction below the surface of the flat bed when the truck is used for cargo and extension above the surface of the flat bed for use in hauling a trailer, and having a horizontal hole, comprising:

(a) a horizontally reciprocatable bolt disposed in the bed for securing the pin in an extended position by sliding into the king pin hole;

(b) a first mechanical control extending from the bolt to an outer edge of the flat bed for reciprocating the bolt into and out of the hole in the king pin:

(c) and a second mechanical control extending from the king pin to an outer edge of the flat bed for extending and retracting the pin.

7. A fifth wheel mechanism for disposing in the bed of a truck, having a bed surface comprising:

(a) a housing having a vertical bore and a smaller intersecting horizontal bore;

(b) an elongated king pin reciprocatable in the vertical housing bore and having a horizontal hole;

(c) a horizontally reciprocatable bolt engaging the housing horizontal bore and reciprocatable to engage the king pin hole to selectively lock the king pin in a position projecting from the housing;

(d) and a mechanical member engaging the king pin and movable about a generally horizontal axis for reciprocating the king pin in the vertical housing bore.

8. A fifth wheel mechanism for disposing in the bed of a truck having a bed surface comprising:

(a) a housing having a vertical bore and a smaller intersecting horizontal bore;

(b) an elongated king pin reciprocatable in the vertical housing bore and having a horizontal hole;

(c) a horizontally reciprocatable bolt engaging the housing horizontal bore and reciprocatable to engage the king pin hole to selectively lock the king pin in a position projecting from the housing;

(d) and mechanical movable means engaging the king pin and permanently attached to at least one of said housing or said king pin for reciprocating the king pin in the vertical housing bore.

* * * * *